United States Patent [19]
Ellis et al.

[11] Patent Number: 4,674,264
[45] Date of Patent: Jun. 23, 1987

[54] SCREWCAPPING HEAD WITH A HYSTERESIS CLUTCH

[75] Inventors: Darwin L. Ellis; Kyle McKee, both of Richmond, Ind.

[73] Assignee: Aluminum Company of America, Pittsburgh, Pa.

[21] Appl. No.: 825,345

[22] Filed: Feb. 3, 1986

[51] Int. Cl.$^4$ .............................................. B65B 3/20
[52] U.S. Cl. .................................. 53/331.5; 53/317; 192/84 PM; 192/56 R; 464/29
[58] Field of Search .................... 53/317, 331, 331.5; 192/21.5, 56 R, 84 PM; 464/29

[56] References Cited

U.S. PATENT DOCUMENTS

| | | | |
|---|---|---|---|
| 3,221,389 | 12/1965 | Cowell | 464/29 |
| 3,964,240 | 6/1976 | Eurard | 53/317 |
| 3,974,884 | 8/1976 | Gidlund | 464/29 |
| 4,065,234 | 12/1977 | Yoshiyuki et al. | 464/29 |
| 4,364,218 | 12/1982 | Obrist | 53/331.5 |
| 4,485,609 | 12/1984 | Kowal | 53/331.5 |
| 4,492,068 | 1/1985 | Obrist | 53/331.5 |
| 4,599,846 | 7/1986 | Ellis et al. | 53/331.5 |

OTHER PUBLICATIONS

"Now Magnets and Sonar Make Anyone an Expert Fisherman", by Stan Fagerstrom, *Popular Mechanics*, Apr. 1982.

*Primary Examiner*—Robert L. Spruill
*Assistant Examiner*—Donald R. Studebaker
*Attorney, Agent, or Firm*—Thomas J. Connelly

[57] ABSTRACT

A screwcapping head for applying prethreaded closures onto prethreaded containers is disclosed having a hysteresis clutch. The screwcapping head includes a housing adapted to be secured to a rotatable drive spindle and a quill mounted in the housing for free rotation thereto. The screwcapping head also includes a hysteresis clutch having a pair of permanent magnetic rings secured to the housing and a disc of hysteresis material secured to the quill and sandwiched between the pair of permanent magnetic rings. The clutch is capable of slipping after the application of a prethreaded closure onto a prethreaded container at a desired torque value while eliminating the torque reversal feature inherent in synchronous clutches.

29 Claims, 7 Drawing Figures

SCREWCAPPING HEAD WITH A HYSTERESIS CLUTCH

FIELD OF THE INVENTION

This invention relates to a screwcapping head with a hysteresis clutch for applying prethreaded closures onto prethreaded containers.

BACKGROUND OF THE INVENTION

Capping machines for the application of prethreaded closures onto prethreaded containers have been known for years. In order to insure that a prethreaded closure is not applied too tightly, which could possibly result in damage, conventional screwcapping machines are provided with a screwcapping head having a torque-dependent clutch. The clutch limits the maximum torque which can be transmitted to the prethreaded closure. In the past, slipping clutches and mechanical torque limiting clutches have been used. However, magnetic clutches have replaced some of these clutches in certain applications as is disclosed in U.S. Pat. Nos. 4,364,218 and 4,492,068 and 4,599,846. One of the disadvantages of using one of the above-identified magnetic clutches is that the magnets create a reverse torque once a predetermined torque value is reached. In short, the screwcapping head oscillates once the closure is tightened onto a container until the screwcapping head is lifted away from the container. This inherent torque reversal feature tends to reduce the efficiency of such screwcapping heads.

A new type of magnetic clutch, called a hysteresis clutch, has recently been developed which uses a permanent magnet in conjunction with a hysteresis magnetic material. The use of a hysteresis clutch is disclosed in U.S. Pat. No. 4,485,609 and in the April, 1982 issue of *Popular Mechanics* on page 96, in an article entitled "How Magnets and Sonar Make Anyone an Expert Fisherman" by Stan Fagerstrom. In U.S. Pat. No. 4,485,609, a ring of magnetic material encompasses a ring of a hysterloy magnetic material, and the torque of the clutch is varied by axially displacing one member relative to the other. One drawback of this design is that the heavy magnetic material and the hysterloy are located distally away from the longitudinal centerline of the screwcapping head. Such a design creates a large inertia which makes it hard to stop the rotation of the screwcapping head, especially at higher speeds. Likewise, the magnets and inductant rotor, used in the clutch described in *Popular Mechanics*, are arranged parallel to and distally away from the central longitudinal axis of the fishing reel. This design also creates a large inertia value which is detrimental when used in a screwcapping head.

Now a screwcapping head has been invented which uses a hysteresis clutch which improves upon the prior art.

SUMMARY OF THE INVENTION

Briefly, the present invention relates to a screwcapping head for applying prethreaded closures onto prethreaded containers. The screwcapping head includes a housing adapted to be secured to a rotatable drive spindle and a quill mounted in the housing for free rotation therewith. A chuck is coaxially secured to the quill and has a tapered internal surface for gripping a prethreaded closure. The screwcapping head also includes a hysteresis clutch having first and second permanent magnetic rings secured to an internal surface of the housing and a disc of hysteresis magnetic material secured to the quill. The hysteresis material is centered axially between the first and second permanent magnetic rings. The clutch is capable of slipping after the application of a prethreaded closure onto a prethreaded container when a desired torque value is reached.

The general object of this invention is to provide a screwcapping head with a hysteresis clutch. A more specific object of this invention is to provide a screwcapping head with a clutch design which reduces the overall inertia of the screwcapping head.

Another object of this invention is to provide a screwcapping head with a hysteresis clutch which is simple in construction, economical to build and easily assembled.

Still another object of this invention is to provide a screwcapping machine with a non-frictional clutch which eliminates the torque reversal feature inherent in synchronous clutches.

A further object of this invention is to provide a hysteresis clutch which uses a unique design to maximize the magnetic field.

Still further, an object of this invention is to provide a hysteresis clutch which uses a thin rotatable hysteresis magnetic material centered axially between two stationary rings of permanent magnets.

Other objects and advantages of the present invention will become more apparent to those skilled in the art in view of the following description and the accompanying drawings.

DETAILED DESCRIPTION OF THE PREFERRED EMBODIMENT

Figure 1:
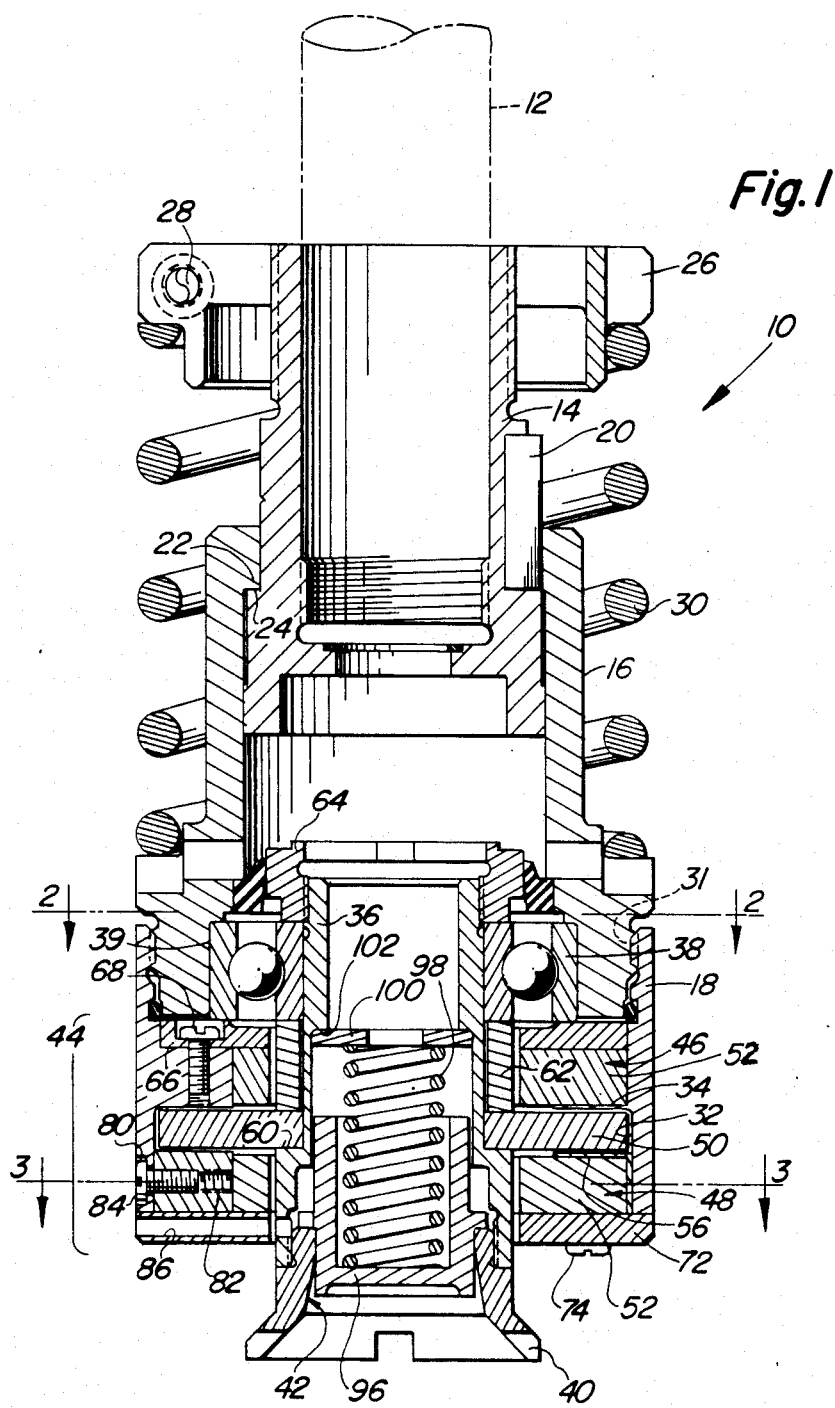
FIG. 1 is a vertical sectional assembly view of a screwcapping head with a hysteresis clutch mounted on a rotatable spindle.

Referring to FIG. 1, a screwcapping head 10 is shown attached to a rotatable drive spindle 12. It is common for a screwcapping machine to utilize a turret assembly having eight, ten or more such screwcapping heads positioned in a circular fashion about the turret which reciprocate up and down so as to move into alignment with a container which is to be sealed with a prethreaded closure. The screwcapping head 10 incorporates a three-piece housing consisting of an elongated sleeve 14 which is threaded onto an end of the drive spindle 12, an upper housing 16 and a lower housing 18. The upper housing 16 is attached to the sleeve 14 by a key 20 and is permitted to move axially thereto. The axial movement is limited in the downward direction by a lip 22 formed on the upper housing 16 which abuts a shoulder 24 formed on the sleeve 14. A split collar 26 is threaded onto the upper end of the sleeve 14 and is clamped thereto by a screw 28. The split collar 26 provides a stop for a compression spring 30 which biases the upper housing 16 downward.

The lower housing 18 is threaded onto the upper housing 16 by threads 31. The lower housing 18 is hollow and contains an irregular inner circumferential surface 32 with a circular radially inwardly projecting lip 34. The purpose of the lip 34 will be explained shortly. Mounted within the upper and lower housing 16 and 18, respectively, is a quill 36 which is designed for free rotation thereto. The free rotation is provided by means of a ball bearing 38 which is pressed into a circular groove 39 formed on a lower portion of the upper housing 16. Coaxially secured to the lower end of the quill 36 is a chuck 40 which contains a tapered internal surface 42 for gripping a prethreaded closure (not shown). Preferably the chuck 40 is attached to the quill 36 by threads so that different size chucks can be alternatively utilized within the same screwcapping head 10.

Figure 2:
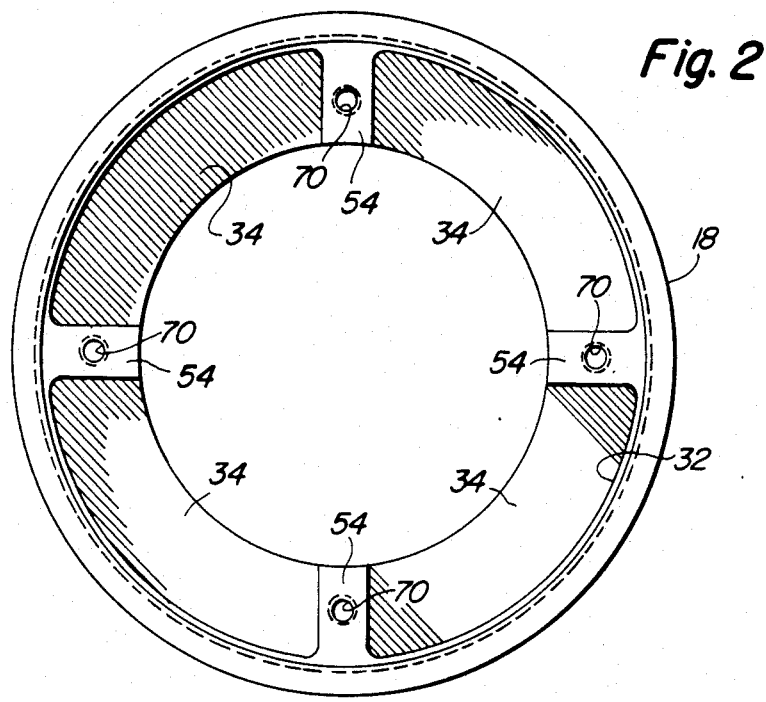
FIG. 2 is a top view of the lower housing taken along the plane 2—2 of FIG. 1.
Figure 3:
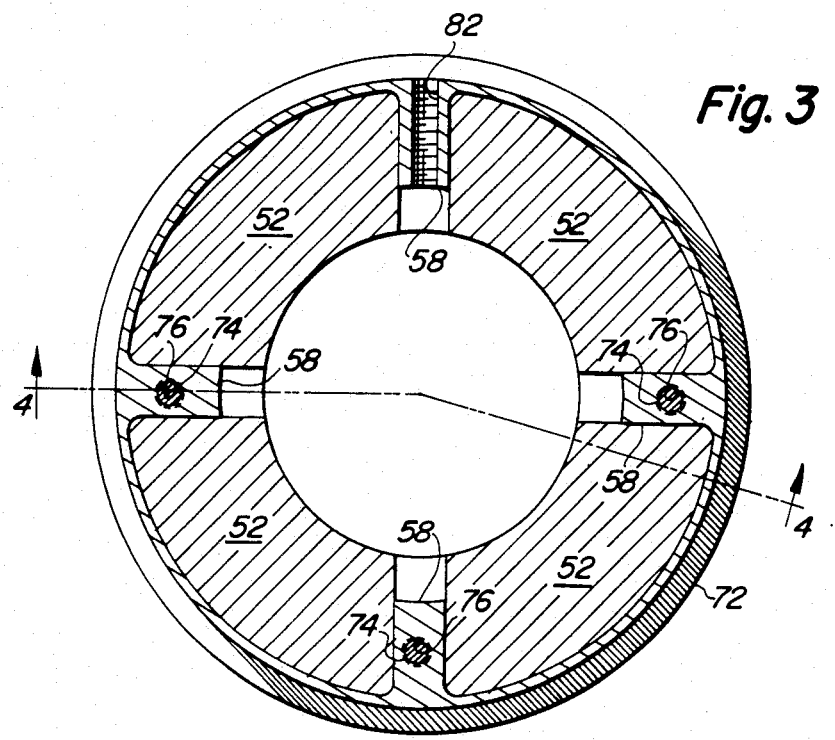
FIG. 3 is a top view of both the carrier plate and the second flux plate taken along the plane 3—3 of FIG. 1.
Figure 4:
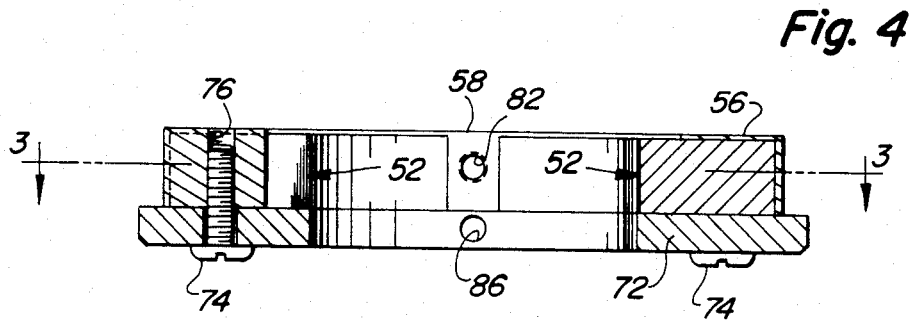
FIG. 4 is a cross-sectional view of the carrier plate and the second flux plate taken along the line 4—4 of FIG. 3.
Figure 5:
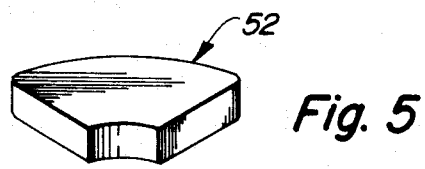
FIG. 5 is a perspective view of one of the magnets retained on the first and second permanent magnetic rings shown in FIG. 1.

The screwcapping head 10 also includes a hysteresis clutch 44 which is capable of transmitting a uniform torque. The clutch 44 includes a first permanent magnetic ring 46, a second permanent magnetic ring 48 and a disc of hysteresis magnetic material 50. The first magnetic ring 46 contains an even number of rare earth magnets 52 having an arcuate shape as is shown in FIG. 5. There are at least two and preferably four arcuate shaped magnets 52 positioned on the lip 34 of the lower housing 18. The magnets 52 are arranged with alternating north-south magnetic fields and are held in place by tangs 54, see FIG. 2, formed integral with the inner circumferential surface 32 of the lower housing 18. The lip 34 is preferably only 0.012 to 0.016 of an inch thick and serves to hold the magnets 52 stationary thereon. The second magnetic ring 48, like the first magnetic ring 46, consists of an even number of rare earth magnets 52 retained in a carrier plate 56. The carrier plate 56, best shown in FIGS. 3 and 4, is loosely fitted into the inner surface 32 of the lower housing 18 for the purpose of permitting rotation between the two members. The carrier plate 56 can be constructed of aluminum, plastic, brass, or other magnetically non-permeable materials. The magnets 52 are positioned within the carrier plate 56 and are retained by tangs 58 in a similar fashion as were the magnets 52 in the first magnetic ring 46. This hysteresis clutch 44 never has an unstable position and therefore is much smoother.

Although the preferred embodiment describes the invention using four arcuate shaped magnets, it is possible to construct the hysteresis clutch 44 using only two semi-circular magnets in each of the first and second magnetic rings. In this arrangement, the north pole of one magnet would be arranged opposite to the south pole of the second magnet within the same ring. It is also possible to use six, eight, ten, twelve, etc. circular cross-sectional segments of magnets equally spaced in a circle on both the first and second magnetic rings. However, since it is advantageous to be able to adjust the position of the magnets in the second magnetic ring 48 relative to the magnets in the first magnetic ring 46, the use of a number of magnets above sixteen reduces the amount of circumferential rotation available between the rings. For example, when the first and second magnetic rings 46 and 48, respectively, each contains four equally spaced magnets, there is 90° of circumferential rotation available between the maximum and minimum torque range of the clutch. If six equally spaced magnets were used in each of the rings, then there would only be 60° of circumferential rotation available between the two rings. Also, one should be aware that when only two magnets are used in each of the first and second magnetic rings 46 and 48, respectively, a weaker magnetic field is usually developed due to the inherent properties of the magnets. Furthermore, one skilled in the art will realize that the diameter of the screwcapping head 10 will limit the size and number of magnets which can properly be assembled.

Referring again to FIG. 1, the hysteresis disc 50 is a magnetic permeable material manufactured and sold by Permag Corporation, located at 2960 South Avenue, Toledo, Ohio 43609. The hysterloy material, Grade 640, works well in this clutch. The hysterloy has the power to conduct lines of magnetic force and is capable of becoming saturated with magnetic fields. The hysterloy exhibits a retardation effect when the forces acting upon it are changed so as to produce a lagging effect in the values of the resulting magnetization therein due to a changing magnetizing force. The hysteresis disc 50 is secured to the quill 36 by a shoulder 60 and a spacer 62. The spacer 62 in turn contacts the bearing 38 and all members are axially held secure by a retainer nut 64. The retainer nut 64 also serves to limit the upward movement of the upper housing 16. The hysteresis disc 50 will rotate with the quill 36, axially between the first and second magnetic rings 46 and 48, respectively. Preferably, the hysteresis disc 50 is perpendicularly aligned to the longitudinal central axis of the quill 36 as well as to the longitudinal central axis of the upper and lower housing 16 and 18, respectively. The use of two magnets 52 on opposite sides of the hysteresis disc 50 produces a more efficient use of the magnetic strength of the magnets 52. In this arrangement, the first and second magnetic rings 46 and 48, respectively, are the drive elements. In order to facilitate assembly, the outside diameter of the hysteresis disc 50 can be made equal to the outside diameter of both the first and second magnetic rings 46 and 48, respectively. The hysteresis disc 50 is then axially sandwiched between the first and second magnetic rings 46 and 48, respectively, in such a fashion that an air gap is present both above and below the hysteresis disc 50. This air gap can vary, but for the present design a distance of approximately 0.020 to 0.030 of an inch is desirable. As the air gap is increased, the strength of the magnetic field between the first and second magnetic rings 46 and 48, respectively, will be decreased. On the other hand, by decreasing the air gap one encounters the possibility of contact between the hysteresis disc 50 and the lip 34 or contact with the top surface of the carrier plate 56 and this could possibly damage the clutch 44.

It is also envisioned that this invention will encompass a hysteresis clutch wherein the hysteresis material 50 is secured to an inner surface of the housing 18 while the first and second magnetic rings 46 and 48, respectively, are secured to the quill 36. However, this design is not as advantageous as the preferred design in that it increases the weight of the quill 36 and therefore increases its inertia.

To conduct the flow of magnetic lines of force back into the first and second magnetic rings 46 and 48, respectively, a pair of flux plates 66 and 72 are utilized. The flux plates 66 and 72 are constructed of a highly magnetically permeable material, such as 410 stainless steel. The flux plates 66 and 72 permit the magnetic lines of force from the first and second magnetic rings 46 and 48, respectively, to be conducted through them with minimum resistance, thereby limiting the outward flow of the magnetic forces from the clutch 44. The first flux plate 66 is attached to the lower housing 18 by screws 68 which thread into threaded bores 70 formed in the tang members 54 of the lower housing 18, as shown in FIG. 2. The second flux plate 72 is secured to the second magnetic ring 48 by screws 74 which thread into threaded bores 76 formed in the carrier plate 56, as shown in FIG. 4. The first and second flux plates 66 and 72, respectively, also assist in permanently holding the first and second magnetic rings 46 and 48 relative to the lower housing 18.

Figure 6:
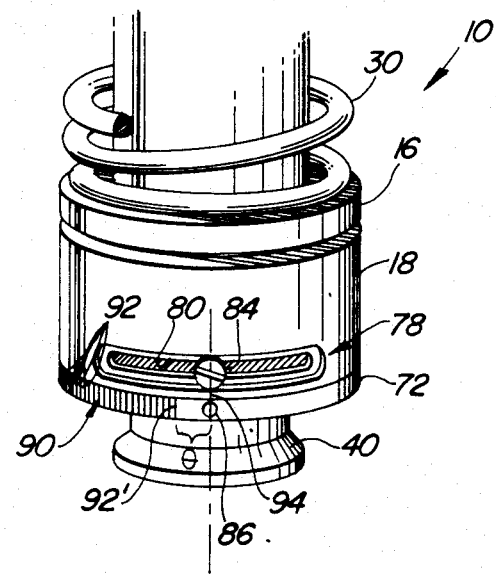
FIG. 6 is an isometric view of the screwcapping head having a hysteresis clutch and showing an adjustment mechanism and a calibration device for positioning the second magnetic ring relative to the first magnetic ring.
Figure 7:
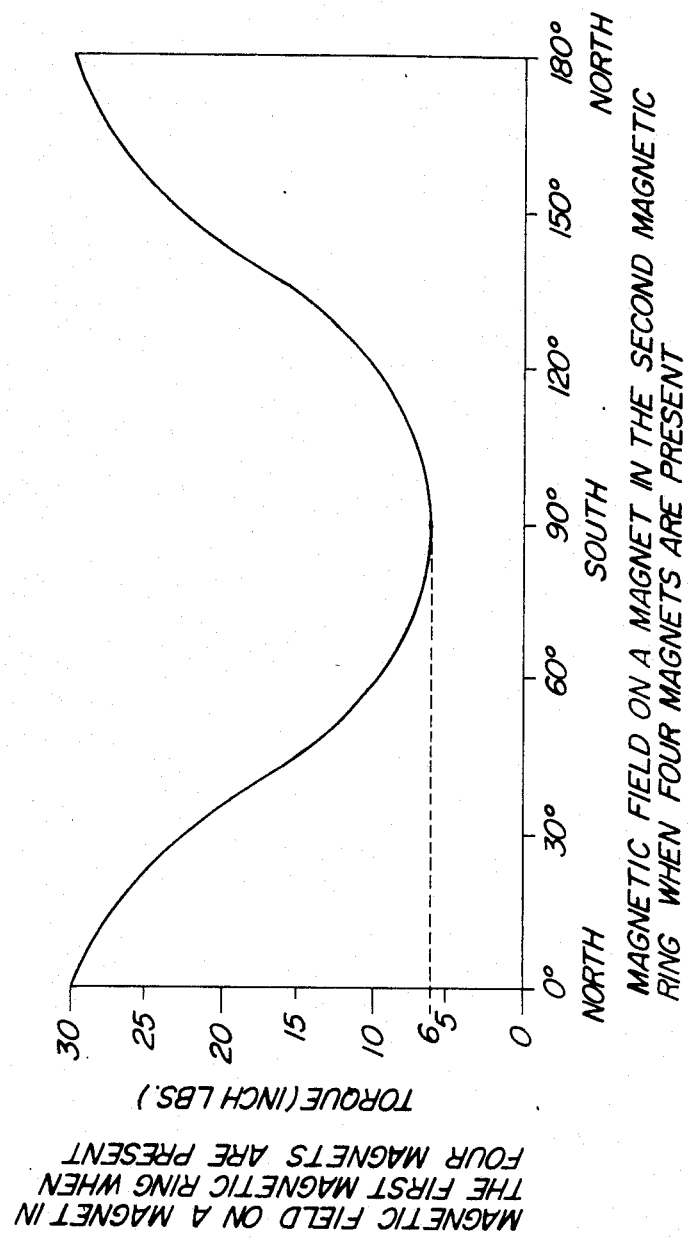
FIG. 7 is a diagrammatic representation of the torque developed by a hysteresis clutch depending on the position of the magnets in the first magnetic ring relative to the magnets in the second magnetic ring.

Referring to FIGS. 6 and 7, the screwcapping head 10 further includes an adjustment device 78 for rotating the second magnetic ring 48 relative to the first magnetic ring 46. The adjustment device 78 includes a slot 80 formed in the circumference of the lower housing 18, a threaded bore 82 formed in the carrier plate 56, see FIG. 1, and a screw 84 which projects through the slot 80 and into the threaded bore 82. A radial bore 86 is formed in the second flux plate 72 and is capable of receiving an elongated pin or tool such as an awl. When the screw 84 is loosened and a pointed tool is inserted into the bore 86, the second magnetic ring 48 can be rotated relative to the first magnetic ring 46. The rotation of the second magnetic ring 48 will change the alignment of the magnets 52 therein relative to the magnets 52 on the first magnetic ring 46. For example, when four arcuate shaped magnets 52 are present in both the first and second magnetic rings 46 and 48, respectively, the maximum torque setting will occur when the north pole of a magnet 52 in the first magnetic ring 46 is aligned opposite to a north pole of a magnet 52 in the second magnetic ring 48. Likewise, the adjacent alternating magnets 52 will have south to south opposing poles. On the other hand, when a north pole of a magnet 52 in the first magnetic ring 46 is aligned opposite to a south pole of a magnet 52 in the second magnetic ring 48, a minimum torque setting will occur. A diagrammatic representation of the torque value for a clutch using four equal strength magnets which are equally spaced in each of the first and second magnetic rings 46 and 48 is depicted in FIG. 7. The curve of the torque value follows approximately a sinusoidal curve. The graph shows the torque range to be between 6 and 30 inch pounds using an air gap of approximately 0.020 of an inch between the upper and lower surfaces of the hysteresis disc 50. As the air gap is increased, say to 0.050 of an inch, the torque range may be shifted downward to approximately 4 to 28 inch pounds. The torque range also depends upon the strength of the magnets, the type of hysteresis material used, the presence or absence of flux plates, etc.

The screwcapping 10 can also contain a calibration device 90 consisting of a plurality of vertical grooves 92 formed on the outer periphery of the second flux plate 72, see FIG. 6. The calibration device 90 provides a visual indication of the alignment between the first and second magnetic rings 46 and 48, respectively. The vertical grooves 92 are designed to be moved into alignment with a vertical groove 94 formed on the lower housing 18. The first vertical groove 92' can be offset from the groove 94 by a predetermined number of degrees, referred to as $\theta$, which can be determined during the assembly process. It is preferable to assemble the clutch 44 with the magnets 52 arranged such that the north pole of the magnets 52 in the first magnetic ring 46 are axially aligned to the south poles of the magnets 52 in the second magnetic ring 48. Opposite magnetic forces tend to attract each other and therefor facilitate assembly. However, in order to get the maximum torque output from the clutch 44, one will want to rotate the second magnetic ring 48 so that the north poles on its magnets 52 will be axially aligned with the north poles on the magnets 52 of the first magnetic ring 46. When four magnets are used in each of the first and second magnetic rings 46 and 48, respectively, 90° of rotation will rotate the center of a north pole magnet 52 on the second magnetic ring 48 to the center of a north pole magnet 52 on the first magnetic ring 46. Therefore, if $\theta$ was 90° and the assembly process was such that the north pole magnets 52 on the first magnetic ring 46 were centrally aligned to the south pole magnets 52 on the second magnetic ring 48, then 90° of rotation would bring the groove 92' into alignment with the groove 94 and yield the maximum torque value. The grooves 92 could be spaced at one degree increments so as to reduce the torque value from the maximum possible torque value if this was desired. It should be noted that other types of calibration or indicating devices could be used which would perform the same function.

Referring again to FIG. 1, a knock-out plunger 96 is located coaxially within the quill 36. The knock-out plunger 96 is biased downward by a spring 98 which is seated against a washer 100. The washer 100 is prevented from moving upward by a shoulder 102 formed on the quill 36. The knock-out plunger 96 assists in removing the prethreaded closure from the chuck 40 as the screwcapping head 10 moves vertically upward after a prethreaded closure has been tightened onto a prethreaded container.

While the invention as been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A screwcapping head comprising a first member secured to a rotatable drive member, a second member secured to said first member for free rotation thereto, and a clutch having a pair of permanent magnetic rings secured to said first member and a disc of hysteresis material secured to said second member and centered axially between said pair of magnetic rings, said hysteresis material exhibiting a retardation effect on magnetic forces passing therethrough to eliminate torque reversal on said second member.

2. A screwcapping head comprising:
 (a) a first member secured to a rotatable drive member;
 (b) a second member secured to said first member for free rotation thereto;
 (c) a clutch having first and second permanent magnetic rings secured to said first member, each of said magnetic rings containing an even number of magnets arranged with alternating north-south fields, a disc of hysteresis material secured to said second member and centered axially between said first and second magnetic rings, said hysteresis material producing a lagging effect in the values of magnetization therein to eliminate torque reversal on said second member; and (d) adjustment means for circumferentially rotating said second magnetic ring relative to said first magnetic ring so as to vary the torque range of said clutch.

3. A screwcapping head comprising:
(a) a housing adapted to be secured to a rotatable drive spindle;
(b) a quill mounted in said housing for free rotation thereto; and
(c) a hysteresis clutch having a pair of permanent magnetic rings secured to said housing and a disc of hysteresis material secured to said quill and sandwiched between said pair of permanent magnetic rings, said hysteresis material producing a lagging effect in the values of magnetization therein to eliminate torque reversal on said second member, said clutch being capable of slipping after the application of a prethreaded closure onto a container at a desired torque value.

4. The screwcapping head of claim 3 wherein said disc of hysteresis material is centered axially between said pair of permanent magnetic rings and has an outside diameter approximately equal to the outside diameter of each of said permanent magnetic rings.

5. The screwcapping head of claim 4 wherein said disc of hysteresis material is perpendicularly aligned to a central axis of said housing.

6. The screwcapping head of claim 4 wherein said disc of hysteresis material is perpendicularly aligned to a central axis of said quill.

7. The screwcapping head of claim 4 wherein said pair of permanent magnetic rings are sandwiched between a pair of flux plates which limit the outward flow of magnetic forces from said magnets.

8. A screwcapping head comprising:
(a) a housing adapted to be secured to a rotatable drive spindle and having an open ended lower portion with an inner circumferential surface;
(b) a quill mounted in said housing for free rotation thereto;
(c) a chuck coaxially secured to said quill having a tapered internal surface for gripping a prethreaded closure; and
(d) a hysteresis clutch having first and second permanent magnetic rings secured to said inner circumferential surface of said housing and a disc of hysteresis material secured to said quill and centered axially between said first and second permanent magnetic rings, said hysteresis material exhibiting a retardation effect on magnetic forces passing therethrough to eliminate torque reversal on said second member, and first and second flux plates covering a surface of said first and second permanent magnetic rings, respectively, said flux plates acting to conduct the flow of magnetic lines fo force leaving said magnetic rings back into said magnetic rings, said clutch being capable of slipping after the application of a prethreaded closure onto a prethreaded container when a desired torque value is reached.

9. The screwcapping head of claim 8 wherein an air space is present between said hysteresis material and said first and second permanent magnetic rings.

10. The screwcapping head of claim 8 wherein said first and second permanent magnetic rings contain rare earth magnets.

11. The screwcapping head of claim 10 wherein each of said magnetic rings contains an even number of magnets.

12. The screwcapping head of claim 11 wherein each of said magnetic rings contains at least four magnets arranged with alternating north-south fields.

13. The screwcapping head of claim 12 wherein said permanent magnets are arcuately shaped, are of the same size and have approximately the same magnetic strength.

14. A screwcapping head comprising:
(a) a housing adapted to be secured to a rotatable drive spindle;
(b) a quill mounted in said housing for free rotation thereto;
(c) a chuck coaxially secured to said quill having a tapered internal surface for gripping a prethreaded closure;
(d) a hysteresis clutch having first and second permanent magnetic rings secured to said housing, a disc of hysteresis material secured to said quill and centered axially between said first and second permanent magnetic rings, said hysteresis material producing a lagging effect in the values of magnetization therein to eliminate torque reversal on said second member, and first and second flux plates secured to and covering a surface of said first and second permanent magnetic rings, respectively, said flux plates acting to conduct the flow of magnetic lines of force leaving said magnetic rings back into said magnetic rings, said clutch being capable of slipping after the application of a prethreaded closure onto a prethreaded container when a desired torque value is reached; and
(e) adjustment means for circumferentially rotating said second magnetic ring relative to said first magnetic ring to enable the torque range of said clutch to be varied.

15. The screwcapping head of claim 14 wherein said second magnetic ring includes a carrier plate which is rotatably mounted within said housing.

16. The screwcapping head of claim 14 including a calibration device present on said second flux plate and said housing which provides an indication of the position of said second magnetic ring relative to said first magnetic ring.

17. The screwcapping head of claim 14 wherein said adjustment means includes a slot formed in said housing, a threaded fastener projecting through said slot and into said second magnetic ring, and a radial bore formed in said second flux plate, whereby loosening of said threaded fastener and insertion of a tool into said radial bore enables said second magnetic ring to be rotated relative to said first magnetic ring.

18. The screwcapping head of claim 14 wherein each of said first and second magnetic rings contains an even number of rare earth magnets arranged with alternating north-south fields.

19. The screwcapping head of claim 14 wherein said first and second magnetic rings are positioned such that a north field on a magnet in said first magnetic ring is axially opposing a north field on a magnet in said second magnetic ring.

20. A screwcapping head for applying prethreaded closures onto prethreaded containers, said screwcapping head comprising:
   (a) a housing having a sleeve secured to a rotatable drive spindle, an upper member secured to said sleeve and axially movable thereon, said upper member being spring biased to a downward position, and a hollow, open ended lower member secured to said upper member and having an inner circumferential surface with a radially inward projecting lip;
   (b) a quill mounted in said housing for free rotation thereto;
   (c) a chuck coaxially secured to said quill having a tapered internal surface for gripping a prethreaded closure; and
   (d) a hysteresis clutch having a first permanent magnetic ring secured to said inner circumferential surface of said housing and positioned on said lip, said first magnetic ring containing an even number of magnets arranged with alternating north-south fields, a second permanent magnetic ring including a carrier plate retaining an even number of magnets arranged with alternating north-south fields secured to said housing distally below said lip, said first and second magnetic rings positioned such that a north field on a magnet in said first magnetic ring is opposing a north field on a magnet in said second magnetic ring, a disc of hysteresis material secured to said quill and centered axially between said first and second magnetic rings with an air space present therebetween, said hysteresis material producing a lagging effect in the values of magnetization therein to eliminate torque reversal on said second member, and first and second flux plates secured to and covering a surface of said first and second magnetic rings, respectively, said flux plates acting to conduct the magnetic lines of force leaving said magnetic rings back into said magnetic rings, said clutch being capable of slipping after the application of a prethreaded closure onto a prethreaded container when a desired torque value is reached.

21. The screwcapping head of claim 20 including adjustment means for circumferentially rotating said second magnetic ring relative to said first magnetic ring to vary the torque range of said clutch.

22. The screwcapping head of claim 20 wherein said disc of hysteresis material has an outside diameter approximately equal to the outside diameter of each of said first and second magnetic rings.

23. The screwcapping head of claim 20 wherein a calibration device is present on said second flux plate and said lower member of said housing and provides on indication of the position of said second magnetic ring relative to said first magnetic ring.

24. A screwcapping head comprising:
   (a) a first member secured to a rotatable drive member;
   (b) a second member attached to said first member for free rotation thereto; and
   (c) a clutch located between said first and second members, said clutch having a pair of permanent magnetic rings secured to one of said first and second members and a disc of hysteresis material secured to the other of said first and second members, said hysteresis material centered axially between said pair of magnetic rings and exhibiting a retardation effect when exposed to changing magnetic forces, thereby eliminating torque reversal on said second member.

25. The screwcapping head of claim 24 wherein said hysteresis material is secured to said first member.

26. The screwcapping head of claim 24 wherein a flux plate is positioned above one of said permanent magnetic rings and below said other permanent magnetic ring.

27. The screwcaping head of claim 24 wherein a flux plate is positioned above said permanent magnetic ring which is located above said hysteresis material and below said permanent magnetic ring located below said hysteresis material.

28. The screwcapping head of claim 24 including an adjustment means for circumferentially rotating one of said magnetic rings relative to the other magnetic ring so as to vary the torque range of said clutch.

29. The screwcapping head of claim 24 wherein a portion of said hysteresis material is separated from said pair of magnetic rings only by air.

* * * * *